United States Patent Office 3,144,471
Patented Aug. 11, 1964

---

3,144,471
25-AZACHOLESTEROL N-OXIDE AND DERIVATIVES
Norman A. Nelson, Kalamazoo, Mich., assignor to The Upjohn Company, Kalamazoo, Mich., a corporation of Delaware
No Drawing. Filed Jan. 4, 1963, Ser. No. 249,338
3 Claims. (Cl. 260—397.5)

This invention relates to novel steroid derivatives and is more particularly concerned with the N-oxides and the N-oxide acid addition salts of 25-azacholesterol and related compounds.

The novel compounds of the invention, in free base form, can be represented by the following formula:

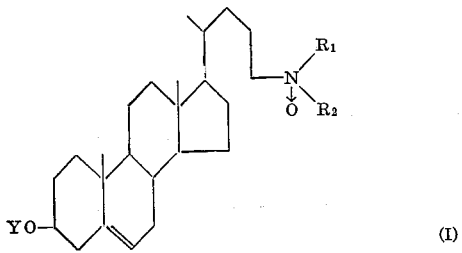

(I)

wherein $R_1$ and $R_2$ each represent lower-alkyl and Y is selected from the class consisting of hydrogen and —COR wherein R is lower-alkyl.

The term "lower-alkyl" means alkyl containing from 1 to 8 carbon atoms, inclusive, such as methyl, ethyl, propyl, butyl, amyl, hexyl, heptyl, octyl and isomeric forms thereof.

The novel compounds of the invention also include the salts of the compounds of Formula I above with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids, and the like.

The novel compounds of the invention, i.e., the compounds of the Formula I and the pharmacologically acceptable acid addition salts thereof, possess pharmacological activity. Thus the compounds of the invention are active as agents for the lowering of cholesterol blood levels in mammals including animals of economic value. The novel compounds of the invention possess advantages as cholesterol-lowering agents over the corresponding compounds lacking the N-oxide group, i.e., the free amines from which the N-oxides are derived, in that the novel compounds of the invention are markedly less toxic, i.e., have a significantly higher therapeutic ratio, then the corresponding free amines.

In addition, the compounds of the invention possess activity as coronary vasodilators and as central nervous system depressants. For example, the compounds of the invention can be used as sedatives and general anesthetics in the laboratory manipulation of experimental animals.

The novels compounds of the invention can be prepared and administered to mammals and birds in a wide variety of oral or parenteral dosage forms, singly or in admixture with other coacting compounds. They can be administered with a pharmaceutical carrier which can be a solid material or liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs.

In addition to their pharmacological usefulness, the compounds of the invention are also useful as intermediates in chemical synthesis. Illustratively, the compounds of the invention having the Formula I are useful, in accordance with U.S. Patents 1,915,334 and 2,075,359, in forming amine fluosilicate mothproofing agents.

The compounds of Formula I in free base form can be prepared from the corresponding free amines by methods known in the art for the preparation of N-oxides. Illustratively, the free base form of the compounds of the Formula I can be prepared by reacting the corresponding free amine having the following formula:

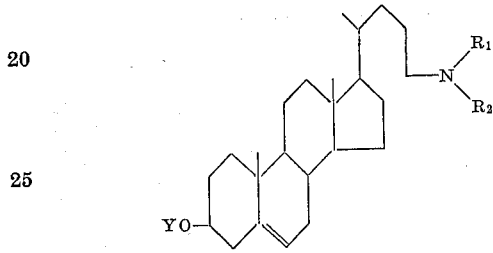

(II)

wherein $R_1$, $R_2$ and Y have the significance defined above, with hydrogen peroxide. The reaction is normally conducted in an organic solvent such as methanol, ethanol, isopropanol, and like lower-alkanols, acetone, and ethyl acetate. The reaction is preferably carried out at room temperature, i.e., of the order of 25° C. but temperatures from the order of about 0° to about 80° C. can be employed if desired. The hydrogen peroxide is generally employed in excess of the stoichiometric quantity and in the commercially available 30% by volume concentration but other concentrations of hydrogen peroxide, either higher or lower, can also be employed. The reaction is allowed to proceed to completion, generally for a time of the order of several hours, at the end of which period the excess hydrogen peroxide is decomposed by the addition of a catalyst such as platinum, platinum oxide, palladium, Raney nickel or a reducing agent, e.g., inorganic hydrosulfites, such as sodium hydrosulfite and the like. The excess catalyst or reducing agent is removed, for example, by filtration and the desired Compound I is isolated from the reaction mixture, for example, by evaporation of the solvent and is purified, if necessary, by conventional procedures such as by recrystallization.

The acid addition salts of the invention can be prepared from the free base form of Compound I by procedures well known in the art, for example, by direct reaction of the free base with the appropriate acid in solution in a suitable solvent or by a process of metathesis.

The free amines of the Formula II can themselves be prepared by methods known in the art. The compound azacholesterol (II; $R_1=R_2=$methyl; Y=H) is a known compound and the other compounds of Formula II can be prepared by methods analogous to those known in the art for the preparation of azacholesterol and its 3-acylates.

For example, following the procedure described by Louw et al., Rec. trav. chim., 73, 667 (1954), for the preparation of azacholesterol and the corresponding N, N-diethyl analogue (II; $R_1=R_2=Et$, $Y=H$), $3\beta$-acyloxy-5-cholenic acid chloride is reacted with the appropriate amine $R_1R_2NH$, wherein $R_1$ and $R_2$ have the significance hereinbefore defined, to form the corresponding N,N-disubstituted amide and the latter compound is then reduced with a reducing agent known in the art for the reduction of amides to amines, for example, lithium aluminum hydride in the presence of an inert solvent such as ether, tetrahydrofuran, N-methylmorpholine, 1,2-dimethoxyethane, and the like to produce the desired amine (II; $Y=H$). The 3-acylates of the compound (II; $Y=H$) can be prepared by conventional acylation procedures, for example, by reacting the latter compound with the appropriate acid halide or acid anhydride in the presence of a tertiary amine such as pyridine, triethylamine, triisopropylamine and like trialkylamines. In order to obtain optimum yields of acylate using the acid halide it is preferable, when pyridine is employed as the reaction medium, to have present also at least a stoichiometric amount of a stronger base such as a trialkylamine, for example, triethylamine, triisopropylamine and the like, or an inorganic base such as powdered potassium carbonate.

The following preparation and examples illustrate the best mode contemplated by the inventor for carrying out his invention, but are not to be construed as limiting the scope thereof.

PREPARATION 1

*24-Dipropylamino-3β-Hydroxy-5-Cholene*

To a mixture of 20.8 g. (0.05 mole) of $3\beta$-acetoxy-5-cholenic acid (British Patent 453,773) in 200 ml. of dry tetrahydrofuran and 10 drops of pyridine at 0° C. is added, with stirring, 35 ml. of oxalyl chloride. The resulting mixture is stirred at 0° C. for a further 30 minutes and then at approximately 25° C. for 45 minutes before being concentrated to near dryness using a rotary evaporator at a temperature below 25° C. To the residue is added 200 ml. of benzene and the mixture is again concentrated to near dryness at a temperature below 25° C. The residue is dissolved in 250 ml. of anhydrous benzene and is added with stirring to a solution of 10.1 g. (0.1 mole) of dipropylamine in 900 ml. of benzene maintained at about 5° C. After the addition is complete the reaction mixture is stirred and allowed to warm to room temperature (ca. 25° C.) during a period of 1 hour before being washed successively with water, dilute hydrochloric acid, dilute sodium hydroxide, and water. The washed solution is dried over anhydrous sodium sulfate and filtered. The filtrate is evaporated to dryness under reduced pressure and the residue is recrystallized from aqueous ethanol. There is thus obtained the N,N-dipropylamide of $3\beta$-acetoxy-5-cholenic acid in the form of a crystalline solid.

A warm solution containing 0.05 mole of the above amide in 250 ml. of dry tetrahydrofuran is added dropwise over a period of about 6 hours to a stirred and refluxing mixture of 15 g. of lithium aluminum hydride in 1500 ml. of anhydrous ether. The resulting mixture is then heated under reflux for approximately 30 hours before decomposing the excess lithium aluminum hydride by the cautious addition of 70 ml. of ethyl acetate, followed by 15 ml. of water and 60 ml. of 30% sodium hydroxide solution. The mixture so obtained in filtered and the filtrate is cooled and treated, with stirring, with excess hydrogen chloride. The solid hydrochloride which separates is isolated by filtration, dissolved in 150 ml. of warm methanol and treated with a slight excess of methanolic potassium hydroxide. The resulting solution is cooled and diluted slowly with water. The solid which separates is isolated by filtration, dried, and recrystallized from aqueous ethanol. There is thus obtained 24-dipropylamino-$3\beta$-hydroxy-5-cholene in the form of a crystalline solid.

Using the above procedure, but replacing dipropylamine by other dialkylamines such as methylethylamine, diisopropylamine, dibutylamine, diisobutylamine and dioctylamine, there are obtained the corresponding 24-dialkylamino-$3\beta$-hydroxy-5-cholenes such as 24-methylethylamino-$3\beta$-hydroxy-5-cholene, 24-diisopropylamino-$3\beta$-hydroxy-5-cholene, 24-dibutylamino-$3\beta$-hydroxy-5-cholene, 24-diisobutylamino-$3\beta$-hydroxy-5-cholene, and 24-dioctylamino-$3\beta$-hydroxy-5-cholene.

PREPARATION 2

*3β-Acetoxy-24-Dimethylamino-5-Cholene*

A solution of 1 g. of 24-dimethylamino-$3\beta$-hydroxy-5-cholene in a mixture of 1 ml. of acetic anhydride and 10 ml. of pyridine is maintained for several hours at room temperature before being poured into dilute aqueous sodium carbonate solution. The solid which separates is isolated by filtration, washed with water, and recrystallized from aqueous ethanol. There is thus obtained $3\beta$-acetoxy-24-dimethylamino-5-cholene in the form of a crystalline solid.

In similar manner by reacting the appropriate 24-dialkylamino-$3\beta$-hydroxy-5-cholene with the appropriate acid anhydride or acid halide in the presence of pyridine there are obtained other $3\beta$-acyloxy-24-dialkylamino-5-cholenes such as the $3\beta$-acetates, $3\beta$-propionates, $3\beta$-isobutyrates, $3\beta$-caproates, $3\beta$-caprylates and $3\beta$-octanoates of 24-diethylamino-, 24-dipropylamino-, 24-methylethylamino-, 24-diisopropylamino-, 24-dibutylamino-, 24-diisobutylamino-, and 24-dioctylamino-$3\beta$-hydroxy-5-cholene.

EXAMPLE 1

*25-Azacholesterol N-Oxide and the Hydrochloride Thereof*

A solution of 3.87 g. (0.01 mole) of 25-azacholesterol (Louw et al., supra) in 100 ml. of absolute ethanol was stirred and treated at room temperature (ca. 25° C.) with 20 ml. of 30% hydrogen peroxide. The resulting mixture was stirred for 12 hours at room temperature before decomposing the excess hydrogen peroxide by the addition of 0.5 to 1.5 g. of platinum oxide. The mixture was stirred until evolution of oxygen ceased and was then filtered. The filtrate was evaporated to dryness under reduced pressure and the residue was recrystallized from a mixture of ethanol and acetone. There was thus obtained 25-azacholesterol N-oxide dihydrate in the form of a crystalline solid having a melting point of 196 to 197° C. (decomp.).

To a cool solution of 1 g. of the 25-azacholesterol N-oxide so obtained in 100 ml. of ether and 20 ml. of absolute ethanol was added dropwise with stirring a slight excess of a 0.1 N ethereal solution of hydrogen chloride. The solid which separated was isolated by filtration, washed with ether and dried in vacuo. There was obtained 25-azacholesterol N-oxide hydrochloride in the form of a crystalline solid having a melting point of 231° C. (decomp.).

EXAMPLE 2

*3β-Acetoxy-24-Dimethylamino-5-Cholene N-Oxide and the Hydrochloride Thereof*

Using the procedure described in Example 1, but replacing 25-azacholesterol by $3\beta$-acetoxy-24-dimethylamino-5-cholene (25-azacholesterol $3\beta$-acetate) there are obtained $3\beta$-acetoxy-24-dimethylamino-5-cholene N-oxide and the hydrochloride thereof.

In like manner, using the procedure described in Example 1, but replacing 25-azacholesterol by the appropriate 24-dialkyl-amino-$3\beta$-hydroxy-5-cholene or $3\beta$-acyloxy-24-dialkylamino-5-cholene there are obtained the corresponding 24-dialkylamino-$3\beta$-hydroxy-5-cholene N-oxide and $3\beta$-acyloxy-24-dialkylamino-5-cholene N-oxides, respectively, and the corresponding hydrochlorides thereof.

Representative compounds prepared in this manner are:

24-dipropylamino-3β-hydroxy-5-cholene N-oxide,
24-methylethylamino-3β-hydroxy-5-cholene N-oxide,
24-diisopropylamino-3β-hydroxy-5-cholene N-oxide,
24-dibutylamino-3β-hydroxy-5-cholene N-oxide,
24-diisobutylamino-3β-hydroxy-5-cholene N-oxide,
24-dioctylamino-3β-hydroxy-5-cholene N-oxide,
3β-acetoxy-24-dipropylamino-5-cholene N-oxide,
3β-propionyloxy-24-dipropylamino-5-cholene N-oxide,
3β-acetoxy-24-methylethylamino-5-cholene N-oxide,
3β-isobutyroxy-24-dimethylamino-5-cholene N-oxide,
3β-caproyloxy-24-dimethylamino-5-cholene N-oxide, and the hydrochlorides of the aforesaid compounds.

EXAMPLE 3

*25-Azacholesterol N-Oxide Hydrobromide and Sulfate*

Using the procedure described in Example 1, for converting 25-azacholesterol N-oxide to its hydrochloride, but replacing ethereal hydrogen chloride by ethereal hydrogen bromide or ethereal sulfuric acid, there are obtained the hydrobromide and the sulfate of 25-azacholesterol N-oxide.

In like manner from the appropriate 24-dialkylamino-3β-hydroxy-5-cholene N-oxide or 3β-acyloxy-24-dialkylamino-5-cholene N-oxide and the appropriate acid there are obtained other acid addition salts of the N-oxides of the invention.

I claim:

1. A compound selected from the class consisting of (*a*) a compound having the formula:

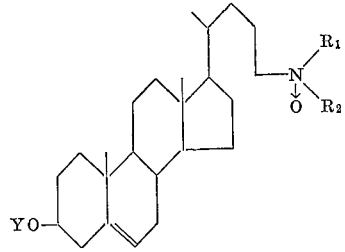

wherein $R_1$ and $R_2$ each represents lower-alkyl and Y is selected from the class consisting of hydrogen and —COR, wherein R is lower-alkyl and (*b*) the pharmacologically acceptable acid addition salts thereof.

2. 25-azacholesterol N-oxide.
3. 25-azacholesterol N-oxide hydrochloride.

No references cited.